United States Patent Office 3,186,793
Patented June 1, 1965

3,186,793
CLARIFICATION OF ACIDIC PHOSPHATIC SOLUTIONS
Marvin B. Gillis, Glenview, Ill., and James G. Gilchrist, Jr., Bartow, Fla., assignors to International Minerals & Chemicals Corporation, a corporation of New York
No Drawing. Filed Oct. 10, 1960, Ser. No. 61,344
10 Claims. (Cl. 23—165)

This invention generally relates to acidic phosphatic solutions. More particularly, the invention relates to the preparation of solutions of inorganic, acidic phosphatic materials, such as wet process phosphoric acid.

In conventional methods for the production of aqueous solutions of inorganic, acidic phosphatic materials, the reaction product which results from reacting phosphate rock with sulfuric acid is filtered and water leached to separate out the calcium sulfate and other solid impurities to yield a crude dilute aqueous acidic phosphatic solution which is then concentrated to produce an aqueous acidic phosphatic solution in which is suspended a substantial quantity of solid impurities. The solution also contains dissolved impurities. The so-called wet process phosphoric acid of commerce is produced in such a process.

The problems occasioned by suspended solid impurities and dissolved impurities are particularly acute with respect to wet process phosphoric acid. Conventional practice yields a crude wet process phosphoric acid containing about 15% to about 35% by weight of phosphorus pentoxide ($P_2O_5$) and a substantial portion of suspended solid impurities which do not readily settle. Such crude, dilute wet process acid is normally concentrated to increase the $P_2O_5$ content to at least about 45% by weight and more frequently to at least 50% by weight. The resultant concentrated acid is usually very dark, sometimes almost black, in color. The concentration procedure necessarily also serves to proportionately increase the quantity of suspended solid impurities and yields concentrated acid solutions frequently containing from about 15% to about 30% by volume of suspended solids, which solids are particularly difficult to remove from the solution.

In general, it has been determined that the impurities present in wet process acidic phosphatic solutions, such as wet process phosphoric acid, comprise calcium sulfate anhydrite, calcium sulfate hemihydrate, iron and aluminum phosphates, and, in acidic solutions resulting from concentration procedures, such as submerged combustion evaporation, or other procedures in which organic materials are introduced in small amounts, double salts of iron and aluminum phosphates with phosphoric acids bearing organic substituents which hypothetically may be represented by the formula $RPO_4 \cdot 2H_3PO_4$ where "R" is an organic radical derived from the organic material employed in the production of the particular phosphatic solution treated. There may also be other organic and inorganic materials present.

Upon standing in storage or during shipment in tank cars or the like, such acidic phosphatic solutions deposit a layer of solid matter which renders handling of the stored or shipped acid exceedingly difficult and frequently economically unfeasible. Some solids and color may be removed from the crude solution by filtration. However, the concentrated acid is very viscous and difficult to filter and further the solids are of such a nature that they readily plug the filter and the solids are very difficult to remove from the filter. Further, even when the acid has the solids removed therefrom as by filtration, upon standing solids form in the solution and settle out, thereby producing the same problem again. The solids which subsequently form in the solution and settle out of the solution are usually termed post-precipitated solids, and the mechanism is termed post-precipitation.

The removal of suspended solid impurities from wet process phosphatic solutions as contemplated by the invention differs fundamentally from the defluorination of similar phosphatic solutions. The present invention, which may only incidentally reduce the fluorine content of the acidic phosphatic solution treated is applicable to remove suspended solids from either defluorinated or undefluorinated aqueous solutions of inorganic phosphates and to decrease the post-precipitation from such solutions.

It is, accordingly, an object of the present invention to provide a method for removing impurities from acidic inorganic phosphatic solutions. It is another object of this invention to provide a process for the production of wet process phosphoric acid which demonstrates substantially less post-precipitation of solids than conventional wet process phosphoric acid.

It is a further important object of the invention to provide a method effective to increase significantly the settling rate of solids suspended in wet process phosphoric acid and similar solutions of acidic inorganic phosphatic materials.

It is an additional important object of the invention to provide a wet process phosphoric acid sufficiently free of suspended solid impurities that may be shipped or stored without appreciable post-precipitation or sedimentation over an extended period of time.

It is an additional object of the invention to provide an economical process for the clarification of wet process phosphoric acid.

It is a more specific object of the invention to provide a process for the clarification of concentrated wet process phosphoric acid which is appropriate for installation in a conventional wet process phosphoric acid plant.

These and other objects and advantages of the present invention will be apparent from the description of the invention.

Now, in accordance with the invention, it has been discovered that solutions of acidic inorganic phosphates containing suspended solid impurities can efficiently be clarified by mixing said solutions with acid treated activated carbon, said acid treated activated carbon being employed in a minor amount effective to increase the settling rate of said suspended solids, and thereafter separating a clarified acidic fraction.

The invention contemplates activated carbons generically. The particular type of activated carbon constitutes no essential part of the invention. In general, the more activated carbons are preferred. Appropriate carbons include Nu Char CEEA produced by West Virginia Pulp and Paper Company and Darco S–51 produced by Atlas Power Company. Activated carbon is a well known and commercially available material which requires no detailed identification. It is essential, however, that the carbon be activated. Unactivated carbon, such as the carbon in alkylation acid, does not achieve the objects of the invention.

In accordance with the present invention, the activated carbon is treated with an acid prior to adding the carbon to the acidic phosphate solution. The carbon may be mixed with a suitable acid to form a slurry, or the acid may be sprayed onto the activated carbon, or any other suitable method of contacting the activated carbon with a suitable acid may be used. The treatment of the activated carbon with the acid may be effected at any suitable temperature. Ambient temperatures are satisfactory, however, lower or higher temperatures may also be used.

The acid used for the treatment of the activated carbon is preferably a mineral acid and more preferably a mineral acid stronger than phosphoric acid, such as sulfuric acid, nitric acid, hydrochloric acid, etc. Any suitable acid concentration may be used. Preferably the acid is of at least 10% concentration by weight. Concentrated acids, such as concentrated sulfuric acid, concentrated nitric acid, concentrated hydrochloric acid, etc. are specifically preferred acids. The relative amounts of acid and activated carbon are not critical. Small amounts of acid added to activated carbon improve the activated carbon for use in the present invention. Large amounts of acid produce a carbon of the desired characteristics. When an excess amount of acid is used, the excess acid may be added with the treated activated carbons to the acidic phosphate solution or the excess acid may be drained from or filtered from the acid treated carbon.

When desired, the acid may be washed off the activated carbon prior to adding it to the acidic phosphatic solution. The acid is preferably in contact with the carbon for at least one minute prior to removing it from the activated carbon or adding the carbon to the acidic phosphatic solution.

The use of the acid treated activated carbon produces a wet process phosphoric acid product superior to that which results from the treatment of wet process phosphoric acid with activated carbon as described in U.S. Patent 1,981,145. As demonstrated by the ensuing example, phosphoric acid produced pursuant to the invention demonstrates substantially less post-precipitation than conventional wet process phosphoric acid treated with activated carbon that has not been acid treated.

The acid treated activated carbon is effective to some degree in substantially all proportions such as that the relative amounts thereof utilized do not constitute an essential feature of the invention. In general, the rate of clarification or settling of solids varies directly with the amount of acid treated activated carbon utilized. The practical upper limit of acid treated activated carbon concentration is determined to a significant extent by economic considerations including activated carbon cost, and cost of separation of precipitated solids from the clarified acidic solution. Normally, the acid treated activated carbon is employed in a minor proportion requisite to provide from about 0.005 to about 50 pounds and preferably from about 1 to about 30 pounds of acid treated activated carbon per ton of acidic solution to be clarified.

The acid treated activated carbon may tend to form agglomerates or lumps when mixed with the acidic phosphatic solutions to be clarified. Accordingly, conventional expedients to effect uniform dispersion of the carbon in the acidic phosphatic solution with a minimum formation of large particles are appropriately utilized. Such expedients include, inter alia, relatively slow addition of the acid treated activated carbon to the acidic phosphatic solution treated accompanied by vigorous agitation.

The process of the invention can be practiced under any desired temperature conditions. The settling rate of the suspended solids and the quantity of solids remaining in the clarified acid are, however, both directly in proportion to the treatment and settling temperature. Accordingly, the practice of the invention at elevated temperatures is preferred. The clarification procedure is preferably performed at temperatures within the range of from about 120° F. to about 250° F., and more preferably from about 175° F. to about 250° F. However, as herein set forth, higher or lower temperatures may be used. Generally, lower temperatures increase the viscosity of the solution with consequent reduction in the settling rate.

The process of the invention is effective in the clarification of acidic phosphatic solutions in all concentrations. Acid phosphate solutions formed by the leaching of acidulated phosphate rock may constitute substantially calcium free phosphoric acid, or, depending upon the degree of acidulation, approach monocalcium phosphate solutions characterized by a $CaO/P_2O_5$ mole ratio of about 1:1. The invention is useful in the clarification of all such solutions and more specifically is applicable to acidic phosphatic solutions ranging from phosphoric acid to monocalcium phosphate. In general, wet process phosphoric acids having a $P_2O_5$ content of above 40% are rather viscous and it is, therefore, difficult to settle the solids. Accordingly, the clarification process of the present invention is preferably effected on dilute acids, of less than about 40% $P_2O_5$ and more preferably on acids having a $P_2O_5$ content in the range from about 15% to about 30%, although it may be used to clarify concentrated wet process phosphoric acid solutions. After clarification of dilute acid in accordance with the process of this invention, the acidic phosphatic solution may, when desired, be concentrated, for example to over 50% $P_2O_5$ content.

Conventional commercial flocculating agents, stable in concentrated mineral acids, and specifically stable in the acidic phosphatic solution being treated, may also be utilized with the acid treated activated carbon clarifying agent of this invention, to expedite the solids settling rate and yield clarified acidic solutions. Flocculating agents suitable for such utilization include water-soluble high molecular weight synthetic polymers such as the polyacrylamides which are sold under the commercial trade name "Separan," guar, the hydrolyzed polyacrylonitrile resins or the salts thereof such as the sodium and potassium salts, and the like. Such commercial flocculating agents are employed in the conventional manner normally in water solution, in about 0.05 to about 2% by weight, in an amount requisite to provide from about 0.001 to about 2 pounds thereof per ton of acidic phosphatic solution treated, and more preferably from about 0.003 to about 0.5 pound per ton of acidic phosphatic solution treated.

After the addition of the acid treated activated carbon clarification agent, and after the addition of the flocculating agent when used, the mixture is handled in a manner to permit the solids to settle out to produce a clarified fraction and a solids-carrying fraction. The mixture may be maintained quiescent thereby permitting the solids to settle or the mixture may be centrifuged thereby settling the solids. Other methods of settling solids in a liquid may, of course, be used.

The sludge or solids layer resulting from the clarification of acidic phosphatic solutions in accordance with this invention contains a substantial proportion of $P_2O_5$ and is useful, inter alia, in the manufacture of fertilizers and particularly as a binding agent for the manufacture of granulated phosphatic fertilizers.

In order to give a fuller understanding of the invention, but with no intention to be limited thereto, the following specific example is given.

EXAMPLE

Three 500 gram samples, designated A, B, and C, of fresh wet process phosphoric acid having a $P_2O_5$ content of about 26% were placed in beakers in a water bath maintained at 176° F.

Sample A was clarified pursuant to this invention. The acid treated activated carbon was prepared by stirring 2.5 grams of activated carbon into 50 grams of a 50% $H_2SO_4$ solution. The acid treated carbon was then filtered and washed with distilled water to remove excess $H_2SO_4$. The 2.5 grams of acid treated activated carbon was then added to wet process phosphoric acid Sample A and stirred for one hour at 176° F. The sample was the filtered and the resulting green filtrate was avaporated to a $P_2O_5$ level of about 54%. After evaporation, the sample was maintained quiescent in an oven maintained at 167° F. At the end of 24 hours, the solids content of the sample was determined. The supernatant liquid was then decanted from the sample and the supernatant liquid was maintained quiescent at room temperature for an additional 7 days. At the end of 7 days, the solids content was again measured.

Sample B was treated in substantially the same manner as Sample A except that the activated carbon was not treated with an acid.

Sample C was utilized as a control, with no additive being added to the sample.

The results of these tests are indicated below in the table.

Table

| Sample | Additive | Weight percent of solids settled | |
|---|---|---|---|
| | | 24 hrs. at 167° F. | 7 days at room temp. |
| A | Acid treated activated carbon | 1.3 | 0.19 |
| B | Activated carbon | 1.2 | 1.42 |
| C | None | 2.67 | 3.25 |

The results of the tests clearly indicate that the use of the acid treated activated carbon in accordance with this invention produced an acid having a very low amount of post-precipitation.

The invention, as illustrated by the foregoing example, affords an efficient and economical method for the rapid clarification of wet process acidic phosphatic solutions. The clarified product is of good quality and the sludge or solids material formed finds utility in the fertilizer industry. The invention accordingly represents a significant contribution to the art.

The description of the invention utilized specific reference to certain process details; however, it is to be understood that such details are illustrative only and not by way of limitation. Other modifications and equivalents of the invention will be apparent to those skilled in the art from the foregoing description.

We claim:

1. A process for the clarification of an aqueous solution containing as essential ingredients phosphatic materials of the group consisting of phosphoric acid, monocalcium phosphate and mixtures thereof, said solution containing suspended impurities and dissolved impurities, comprising mixing said solution with an acid-treated actvated carbon prepared by treating previously activated carbon with an acid of at least 10% concentration by weight selected from the group consisting of sulfuric acid, hydrochloric acid and nitric acid, said acid-treated activated carbon being employed in the amount of about 1 lb. to about 30 lbs. per ton of said solution, and thereafter separating a clarified fraction.

2. A process for the clarification of an aqueous solution containing as essential ingredients phosphatic materials of the group consisting of phosphoric acid, monocalcium phosphate and mixtures thereof, said solution containing suspended impurities and dissolved impurities, comprising agitating said solution with an acid-treated activated carbon prepared by treating previously activated carbon with an acid of at least 10% concentration by weight selected from the group consisting of sulfuric acid, hydrochloric acid and nitric acid, said acid-treated activated carbon being employed in the amount of about 1 lb. to about 30 lbs. per ton of said solution, and thereafter maintaining the mixture so produced quiescent to settle at least a substantial portion of solid impurities, and separating the clarified supernatant solution from said settled impurities.

3. The process of claim 1 wherein the acidic phosphatic solution is wet process phosphoric acid.

4. The process of claim 1 wherein the activated carbon was treated with sulfuric acid.

5. The process of claim 1 wherein said acid treated activated carbon is employed in an amount requisite to provide from about 0.005 to about 50 pounds thereof per ton of acidic inorganic phosphatic solution treated.

6. The process of claim 1 wherein said acidic phosphatic solution is wet process phosphoric acid containing from about 15% to about 30% by weight of $P_2O_5$.

7. The process of claim 2 wherein the acidic phosphatic solution is wet process phosphoric acid.

8. The process of claim 2 wherein the activated carbon was treated by immersing in sulfuric acid.

9. The process of claim 2 wherein said acid treated activated carbon is employed in an amount requisite to provide from about 0.005 to about 50 pounds thereof per ton of acidic inorganic phosphate solution treated.

10. The process of claim 2 wherein said acidic phosphatic solution is wet process phosphoric acid containing less than about 40% by weight of $P_2O_5$.

References Cited by the Examiner

UNITED STATES PATENTS

| 1,981,145 | 11/34 | Keller | 23—312 X |
| 1,993,761 | 3/35 | Tippins | 210—38 |
| 2,131,925 | 10/38 | Ware | 210—28 |
| 2,929,777 | 3/60 | Clevenger | 210—54 |
| 2,968,528 | 1/61 | Tuttle et al. | 210—54 |

OTHER REFERENCES

Hassler: "Active Carbon," Chemical Publishing Co., Inc., Brooklyn, New York, 1951, pages 18 and 19.

MAURICE A. BRINDISI, *Primary Examiner.*

GEORGE D. MITCHELL, BENJAMIN HENKIN,
*Examiners.*